US010967853B2

(12) United States Patent
Rayalsamy et al.

(10) Patent No.: US 10,967,853 B2
(45) Date of Patent: Apr. 6, 2021

(54) ENHANCED COLLISION MITIGATION

(71) Applicant: Ford Global Technologies, LLC, Dearborn, MI (US)

(72) Inventors: Purushothaman Rayalsamy, Westland, MI (US); Christopher Pontisakos, Allen Park, MI (US); Alex Maurice Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 174 days.

(21) Appl. No.: 16/272,353

(22) Filed: Feb. 11, 2019

(65) Prior Publication Data
US 2020/0255001 A1  Aug. 13, 2020

(51) Int. Cl.
*B60W 30/085* (2012.01)
*B60W 30/095* (2012.01)

(52) U.S. Cl.
CPC ...... *B60W 30/085* (2013.01); *B60W 30/0953* (2013.01); *B60W 30/0956* (2013.01); *B60W 2520/14* (2013.01)

(58) Field of Classification Search
CPC .................................................. B60W 30/085
See application file for complete search history.

(56) References Cited

U.S. PATENT DOCUMENTS

| | | | |
|---|---|---|---|
| 9,180,881 B2 | 11/2015 | Lim et al. | |
| 9,187,091 B2* | 11/2015 | Mills | B60W 10/18 |
| 9,308,919 B2 | 4/2016 | Schmudderich | |
| 9,650,040 B2* | 5/2017 | Minemura | G01S 13/867 |
| 9,688,273 B2 | 6/2017 | Mudalige et al. | |
| 9,691,282 B2* | 6/2017 | Hartmann | B60W 10/20 |
| 9,878,710 B2 | 1/2018 | Schmudderich et al. | |
| 10,232,849 B2* | 3/2019 | Liu | B60W 30/0956 |
| 10,403,145 B2* | 9/2019 | Deng | G08G 1/166 |
| 2020/0216060 A1* | 7/2020 | Pontisakos | B60W 10/20 |
| 2020/0255001 A1* | 8/2020 | Rayalsamy | B60W 30/0956 |

FOREIGN PATENT DOCUMENTS

| | | |
|---|---|---|
| CN | 105966396 A | 9/2016 |
| CN | 108528431 A | 9/2018 |

* cited by examiner

*Primary Examiner* — Michael A Berns
(74) *Attorney, Agent, or Firm* — Frank A. MacKenzie; Bejin Bieneman PLC

(57) ABSTRACT

A computer includes a processor and a memory, the memory storing instructions executable by the processor to, upon determining that a yaw rate for a host vehicle is below a threshold, identify a front corner point of a target, and to suppress threat mitigation when a time to collision between the host vehicle and front corner point of the target exceeds a time threshold.

19 Claims, 4 Drawing Sheets

ENHANCED COLLISION MITIGATION

BACKGROUND

Vehicle collisions often occur at intersections. Collision mitigation between a host vehicle and a target vehicle or other object may be difficult and expensive to implement. For example, determining a threat assessment for the target may use limited or inaccurate data to assign excessive risk to a scenario that in fact may not require avoidance or mitigation. Furthermore, performing the threat assessment may result in positive identifications of threat that may not require mitigation, which can be operationally costly for a vehicle computer and vehicle components, increasing consumption of processing resources of the vehicle computer to perform the threat assessment and actuate the vehicle components.

DETAILED DESCRIPTION

Figure 1:
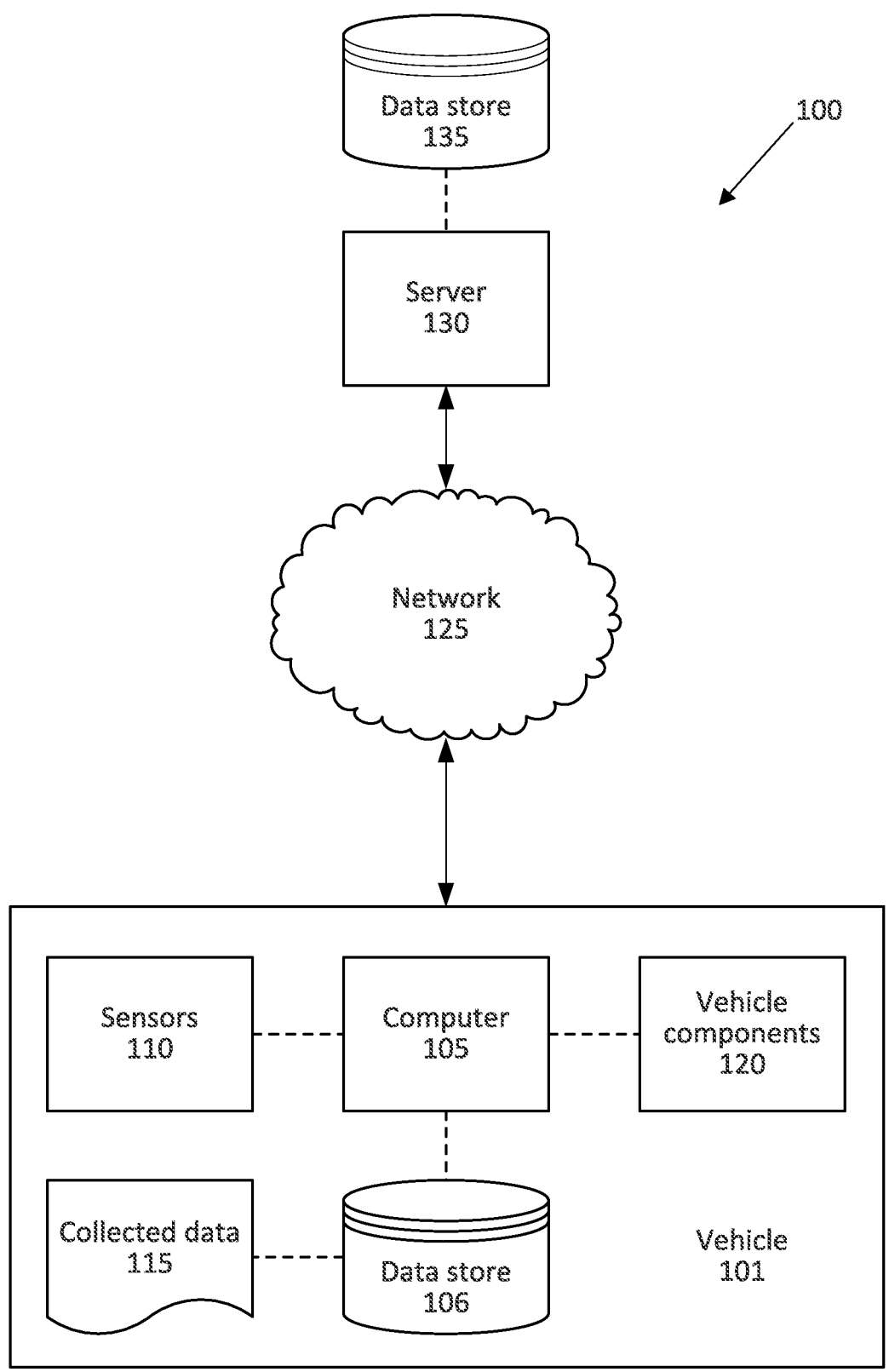
FIG. 1 is a block diagram of an example system for operating a vehicle.

A system includes a computer including a processor and a memory, the memory storing instructions executable by the processor to, upon determining that a yaw rate for a host vehicle is below a threshold, identify a front corner point of a target, and suppress threat mitigation when a time to collision between the host vehicle and front corner point of the target exceeds a time threshold.

The instructions can further include instructions to identify the front corner point as a closest corner point of the target to the host vehicle.

The instructions can further include instructions to determine the time to collision between a front center point of the host vehicle and the front corner point of the target.

The instructions can further include instructions to determine a threat number based on a front center point of the host vehicle and a front center point of the target.

The instructions can further include instructions to determine the threat number based on a center time to collision between the front center point of the host vehicle and the front center point of the target.

The instructions can further include instructions to actuate a component based on a threat number.

The instructions can further include instructions to, upon determining that the threat number exceeds a threat threshold, determine whether the yaw rate is below the threshold.

The instructions can further include instructions to multiply a threat multiplier to the threat number to suppress the threat mitigation.

The instructions can further include instructions to set the threat multiplier to zero when the time to collision exceeds the time threshold.

The instructions can further include instructions to actuate a brake when the time to collision is below the time threshold.

The instructions can further include instructions to identify the front corner point of the target based on a lateral width of the target.

The instructions to suppress threat mitigation can further include instructions to suppress actuation of a brake.

The instructions can further include instructions to determine whether the host vehicle is in a turn based on a sign of the yaw rate.

The instructions can further include instructions to suppress threat mitigation when the sign of the yaw rate is negative.

A method includes upon determining that a yaw rate for a host vehicle is below a threshold, identifying a front corner point of a target and suppressing threat mitigation when a time to collision between the host vehicle and front corner point of the target exceeds a time threshold.

The method can further include identifying the front corner point as a closest corner point of the target to the host vehicle.

The method can further include determining the time to collision between a front center point of the host vehicle and the front corner point of the target.

The method can further include determining a threat number based on a front center point of the host vehicle and a front center point of the target.

The method can further include determining the threat number based on a center time to collision between the front center point of the host vehicle and the front center point of the target.

The method can further include actuating a component based on a threat number.

The method can further include, upon determining that the threat number exceeds a threat threshold, determining whether the yaw rate is below the threshold.

The method can further include multiplying a threat multiplier to the threat number to suppress the threat mitigation.

The method can further include setting the threat multiplier to zero when the time to collision exceeds the time threshold.

The method can further include actuating a brake when the time to collision is below the time threshold.

The method can further include identifying the front corner point of the target based on a lateral width of the target.

The method can further include suppressing actuation of a brake.

The method can further include determining whether the host vehicle is in a turn based on a sign of the yaw rate.

The method can further include suppressing threat mitigation when the sign of the yaw rate is negative.

A system includes a brake in a host vehicle, means for identifying a front corner point of a target upon determining that a yaw rate for the host vehicle is below a threshold, and means for suppressing the brake when a time to collision between the host vehicle and front corner point of the target exceeds a time threshold.

The system can further include means for determining the time to collision between a front center point of the host vehicle and the front corner point of the target.

The system can further include means for determining a threat number based on a front center point of the host vehicle and a front center point of the target.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Upon detecting a target object, a computer in a host vehicle can determine whether the host vehicle is likely to collide with the target. If a collision is likely, the computer can perform collision avoidance and/or mitigation. In particular, collisions are likely when the host vehicle is performing a turn from a current roadway lane to a roadway lane substantially perpendicular to the current roadway lane, e.g., a left turn, that crosses a roadway lane in which the target moves toward the host vehicle. The computer can thus perform collision avoidance and mitigation for targets deemed to be potential threats of collision.

The computer can determine that a threat number of the target exceeds a threshold and perform collision avoidance and/or mitigation. The threat number is a unitless measure of whether a specific target will intersect or collide with the host vehicle. The computer can determine the threat number based on a front center point of a bumper of the host vehicle and a front center point of a bumper of the target.

However, certain host vehicle maneuvers may be similar to a turn but may not put the host vehicle at risk of a collision with the target. For example, when the host vehicle is on a curved roadway, the host vehicle will turn in order to follow the roadway. The computer may interpret the curved path to follow the roadway as a turn and, upon detection of a target in an adjacent lane, perform collision avoidance and mitigation where there is no risk of collision. In another example, if the host vehicle moves from a current lane to an adjacent lane (e.g., a center turn lane), the computer may interpret the steering to move into the adjacent lane as a turn. These false positive identifications of collision avoidance and mitigation can be operationally costly for the computer to computationally perform and to actuate the vehicle components, in addition to posing operational and safety risks to the vehicle.

To reduce false positive identifications, upon determining that the threat number exceeds the threshold, the computer can determine whether a yaw rate of the host vehicle is below a threshold. The threshold can be determined such that yaw rates below the threshold indicate that the host vehicle is not likely in a turn and yaw rates above the threshold indicate that the host vehicle is likely in a turn. For example, the threshold can be a minimum yaw rate required to complete a turn into a perpendicular roadway lane. If the yaw rate is below the threshold, the computer can identify a front corner point of the bumper of the target and determine a predicted time to collision between the host vehicle and the front corner point. The front corner point is typically specified to be the closest point of the target to the host vehicle, so determining the time to collision based on the front corner point rather than the front center point allows the computer to determine more accurately whether to perform collision avoidance and/or mitigation.

FIG. 1 illustrates an example system 100 for operating a vehicle 101. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
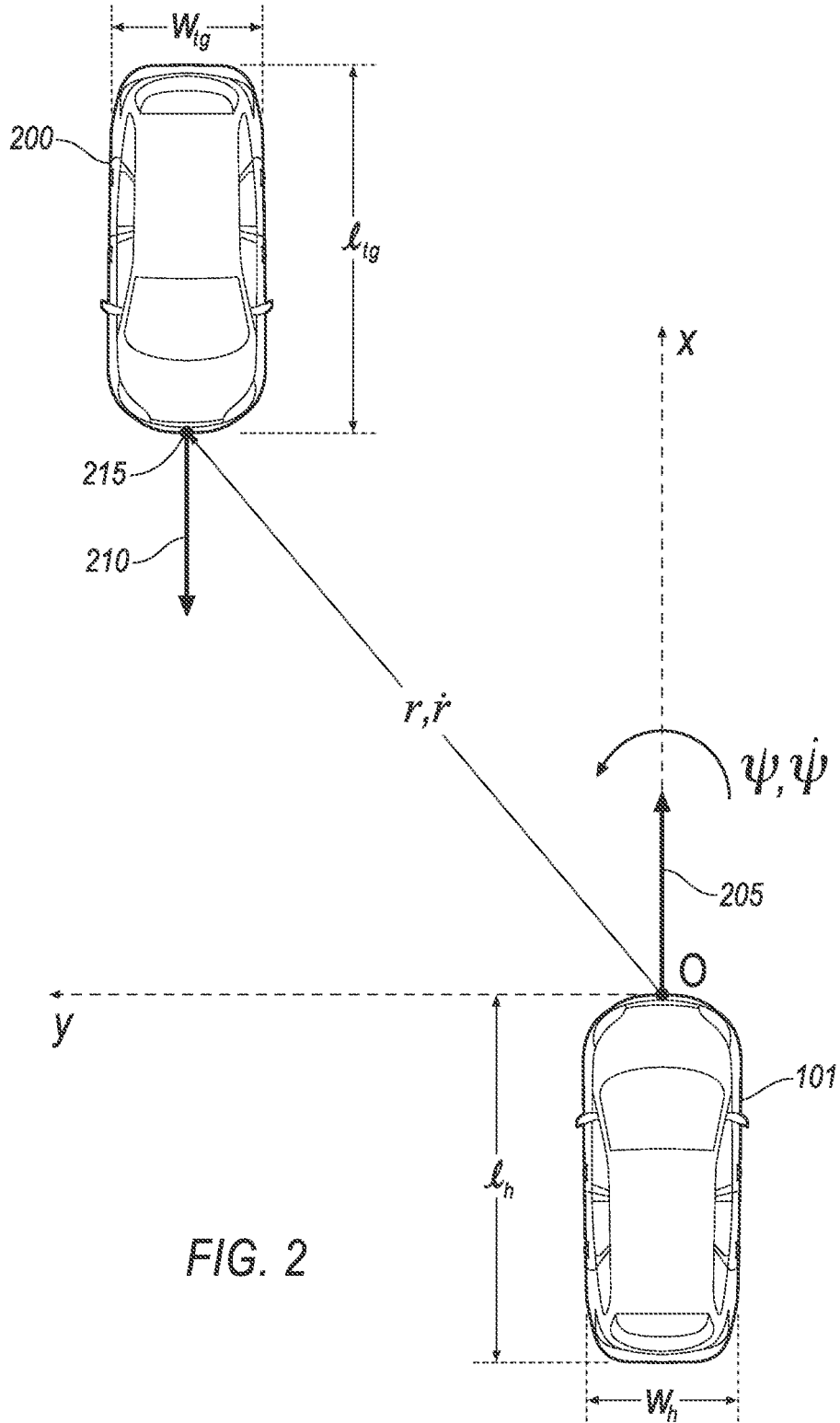
FIG. 2 is a plan view of the vehicle and an example target.

FIG. 2 is a plan view of an example vehicle 101 and an example target 200. The computer 105 can define a two-dimensional rectangular coordinate system. The coordinate system defines a longitudinal direction x and a lateral direction y, and an origin at a point O on a center point of a front bumper of the host vehicle 101. The longitudinal direction x is a vehicle-forward direction, i.e., the direction in which a propulsion 120 moves the vehicle 101 when a steering component 120 is at a neutral position. The lateral direction y is perpendicular to the longitudinal direction x.

The computer 105 can determine a longitudinal length l and a lateral width w for each of the host vehicle 101 and the target 200. Based on data 115 from one or more sensors 110, the computer 105 can determine the length $l_h$ and the width $w_h$ of the host vehicle 101 and the length $l_{tg}$ and the width $w_{tg}$ of the target 200. As used herein, the subscript "h" refers to the host vehicle 101, and the subscript "tg" refers to the target 200. For example, $l_h$ is the length of the host vehicle 101 and $l_{tg}$ is the length of the target 200. The computer 105 can use the lengths $l_h$, $l_{tg}$ and the widths $w_h$, $w_{tg}$ to identify coordinate points on the host vehicle 101 and the target 200, e.g., a front center point of a bumper of the target 200, as described below.

The computer 105 can determine a trajectory 205 of the host vehicle 101 and a trajectory 210 of the target 200. As used herein, a "trajectory" is a predicted a path of travel. Based on the trajectories 205, 210 of the host vehicle 101 and the target 200, the computer 105 can determine a likelihood of a collision.

The computer 105 can determine a range r and a range rate $\dot{r}$. As used herein, a "range" is a distance between two specified points in the coordinate system, e.g., a point on the host vehicle 101 and a point on the target 200. The range rate $\dot{r}$ is rate of change of the range r, i.e., a measure of change of the range r per unit of time. The computer 105 can determine the range r between the origin O and a front center point 215 of the target 200. The front center point 215 of the target 200 can be, e.g., a point substantially at a center of a front bumper of the target 200 at half the width $w_{tg}$ of the target 200. Based on the range r between the origin O and the front center point 215 of the target 200, the computer 105 can determine whether to perform threat mitigation.

The computer 105 can determine a yaw angle $\psi$ and a yaw rate $\dot{\psi}$ for the host vehicle 101. The yaw angle $\psi$ is the angle defined between the trajectory 205 of the host vehicle 101 and the longitudinal axis x. The yaw rate $\dot{\psi}$ is the rate of change of the yaw angle $\psi$, i.e., a measure of change of the range $\psi$ per unit of time. That is, the yaw angle $\psi$ and yaw rate $\dot{\psi}$ represent curved motion of the host vehicle 101. The yaw angle $\psi$ and yaw rate $\dot{\psi}$ can depend on the specific maneuver that the vehicle 101 is performing. For example, if the roadway is curved, the yaw rate $\dot{\psi}$ will increase as the vehicle 101 turns to maintain the vehicle 101 within the roadway lane. In another example, if the vehicle 101 moves from a current roadway lane to an adjacent roadway lane (i.e., performs a lane change), the yaw rate $\dot{\psi}$ will increase as the vehicle 101 moves laterally into the adjacent roadway lane. In another example, if the vehicle 101 is performing a turn from a current roadway lane to a perpendicular roadway lane (e.g., performing a left-hand turn), the yaw rate $\dot{\psi}$ will increase as the vehicle 101 turns into the perpendicular roadway lane. Typically, the yaw rate $\dot{\psi}$ required for a turn into a perpendicular roadway lane is greater than the yaw rate $\dot{\psi}$ for a curved road or for a lane change. Thus, if the yaw rate $\overline{\psi}$ is low, as described below, the computer 105 can determine that the vehicle 101 may not be in a turn (where collision mitigation may be required) but rather in a lane change or on a curved road (where collision mitigation may not be required).

To determine a likelihood of a collision between the host vehicle 101 and the target 200, the computer 105 can determine a "threat number" for the target. As used herein, a "threat number" is a scalar value between 0 and 1 that the computer 105 can use to determine whether a specific target 200 will intersect or collide with the host vehicle 101. Specifically, the computer 105 may determine the acceleration threat number ATN, the brake threat number BTN, and the steering threat number STN for the host vehicle 101 and the target 200, and based on the threat numbers ATN, BTN, STN, which may be combined into a single overall threat number TN, actuate components 120 of the host vehicle 101. The computer 105 can determine the threat number based on the origin O of the host vehicle 101 and the front center point 215 of the target 200. For example, the computer 105 can determine the threat number a center time to collision, i.e., a predicted time to collision between the front center point of the host vehicle 101 and the front center point 215 of the target 200.

The BTN is a measure of a needed longitudinal deceleration to allow the host vehicle 101 to stop or reduce speed before colliding with the target 200. The BTN can be based on a measured host vehicle 101 speed, a distance between the target 200 and the host vehicle 101, and the respective projected trajectories of the target 200 and the host vehicle 101. The computer 105 can determine a longitudinal deceleration to stop or reduce speed of the host vehicle 101 before colliding with the target 200, e.g., 2 m/s². The computer 105 can determine a maximum deceleration of the host vehicle 101, e.g., 8 m/s². The BTN can be the ratio of the needed deceleration to the maximum deceleration, e.g., BTN=2/8=0.25. If the needed deceleration to avoid a collision with the target 200 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target 200. As with the BTN, the computer 105 can determine a needed lateral acceleration to avoid a collision between the host vehicle 101 and the target 200. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target 200. As described above for the BTN and the STN, the computer 105 can determine a needed acceleration to allow the host vehicle 101 to pass the target 200 and a maximum available acceleration of the host vehicle 101. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective overall threat number TN for the target 200.

The computer 105 can actuate one or more vehicle components 120 based on one of the threat numbers exceeding a predetermined threat threshold. The threat threshold can be determined based on, e.g., empirical testing of vehicles 101 in intersections, simulation modeling of vehicles 101, brake capacity, steering limits, etc. For example, if the overall threat number TN is above a threat threshold of 0.7, the computer 105 can actuate a brake 120 to decelerate the host vehicle 101, e.g., to −6.5 meters per second squared (m/s²). In another example, if the threat number is above 0.4 but less than or equal to 0.7, the computer 105 can actuate the brake 120 to, e.g., a deceleration of −2.0 m/s². In another example, if the threat number is greater than 0.2 but less than or equal to 0.4, the computer 105 can display a visual warning on a vehicle 101 HMI and/or play an audio warning over a speaker.

Figure 3:
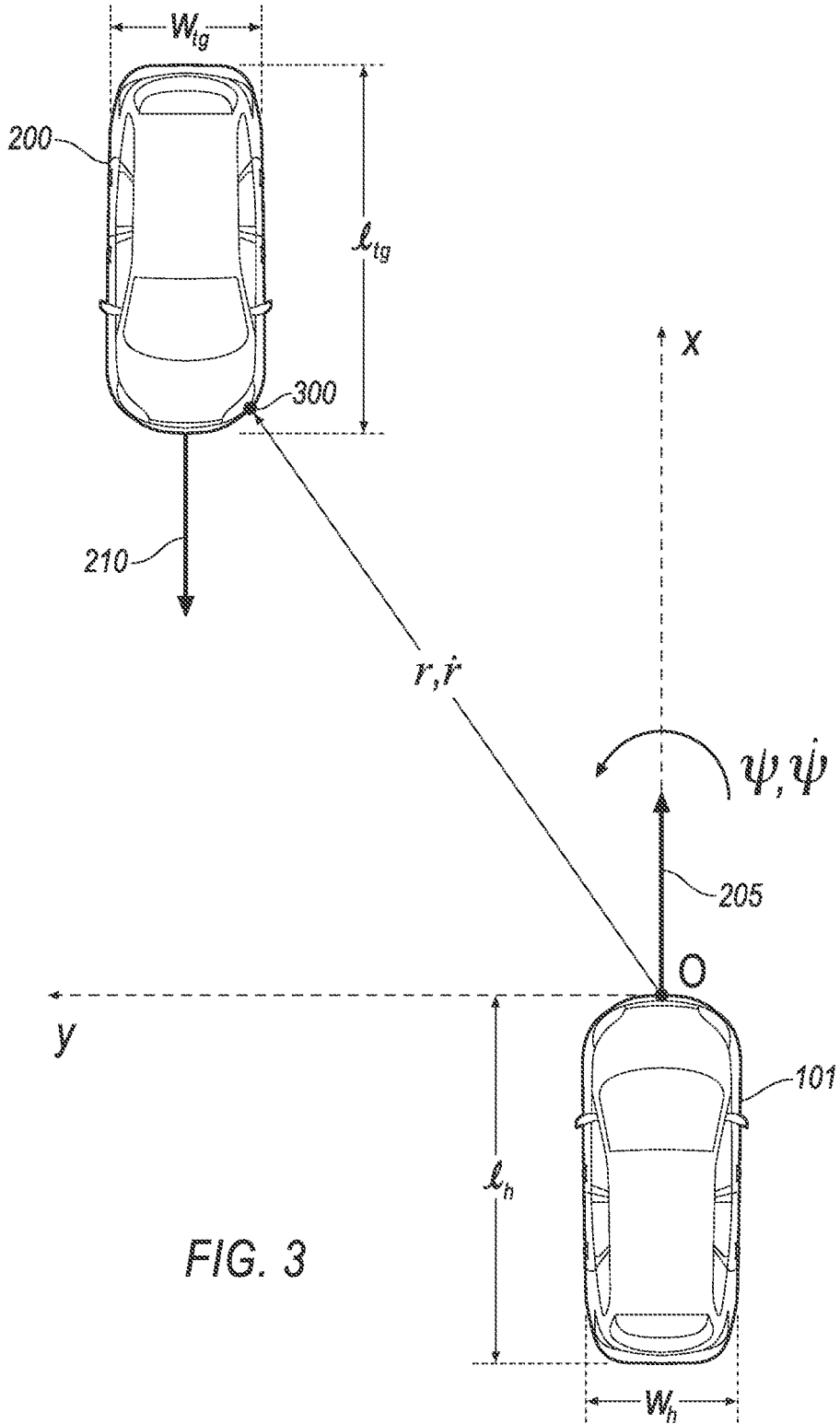
FIG. 3 is a plan view of the vehicle and a front corner point of the example target.

FIG. 3 is a plan view of the host vehicle 101 and the target 200. The computer 105 can identify a front corner point 300 of the target 200. As used herein, a "corner point" is a point on the front bumper or the rear bumper of the target 200 substantially at the width $w_{tg}$ of the target 200. That is, the longitudinal position of the bumpers of the target 200 and width $w_{tg}$ can substantially define a rectangle having four corners. The coordinates of the four corners in the coordinate system are the "corner points." The computer 105 can determine a "front corner point" 300 as one of the corner points at the front of the target 200, e.g., on the front bumper. The computer 105 can identify the front corner point as the closest corner point of the target 200 to the host vehicle 101.

When the threat number exceeds the threshold, as described above, the computer 105 can determine whether the yaw rate $\dot{\psi}$ is below a predetermined threshold. Typically, turns require a greater yaw rate $\dot{\psi}$ than curved roads and lane changes. To determine whether the vehicle 101 is performing a turn that can require collision mitigation, the computer 105 can compare the yaw rate $\dot{\psi}$ to a threshold. The threshold can be determined such that yaw rates $\dot{\psi}$ below the threshold do not indicate that the vehicle 101 is in a turn. For example, the threshold can be determined based on a minimum yaw rate $\dot{\psi}$ required for the vehicle 101 to complete a left-hand turn from a roadway lane to a perpendicular roadway lane. The minimum yaw rate $\dot{\psi}$ can be determined with simulation modeling of estimated yaw rates $\dot{\psi}$ required for turns, curved roads, and lane changes. The simulation modeling can include a roadway lane for a simulated vehicle 101 and a perpendicular roadway lane into which to turn. The simulation model can specify a yaw rate $\dot{\psi}$ and determine whether the vehicle 101 entered the perpendicular roadway lane. The smallest yaw rate $\dot{\psi}$ for which the simulated vehicle 101 turns into the perpendicular roadway lane is the minimum yaw rate $\dot{\psi}$ and can be the threshold. Alternatively, the threshold can be the minimum yaw rate $\dot{\psi}$ multiplied by a safety factor, e.g., 1.5, 2.0, etc. If the yaw rate $\dot{\psi}$ exceeds the threshold, the computer 105 can determine that the vehicle 101 is in a turn and can perform collision avoidance and mitigation based on the threat number. If the yaw rate $\dot{\psi}$ is below the threshold, the computer 105 can determine that the vehicle 101 may be in a false positive scenario that may not require collision mitigation.

The computer 105 can determine a sign of the yaw rate $\dot{\psi}$, i.e., whether the yaw rate $\dot{\psi}$ is positive or negative. In the coordinate system shown in FIGS. 2 and 3, a positive yaw rate $\dot{\psi}$ is counterclockwise, i.e., when the vehicle 101 turns left. In a right-handed roadway lane, where vehicles 101 drive on the right side of the road, a left-turning host vehicle 101 (having a positive yaw rate $\dot{\psi}$) will typically cross a roadway lane in which targets 200 are moving toward the host vehicle 101. Thus, a positive yaw rate $\dot{\psi}$ can indicate that the host vehicle 101 is in a left turn, and a negative yaw rate $\dot{\psi}$ can indicate that the host vehicle 101 is in a right turn that does not cross roadway lanes with oncoming target 200. That is, the computer 105 can determine whether the host vehicle 101 is in a turn based on a sign of the yaw rate $\dot{\psi}$. The computer 105 can suppress threat mitigation when the sign of the yaw rate $\dot{\psi}$ is negative. Alternatively, in a left-handed roadway lane, where vehicles 101 drive on the left side of the road, a positive yaw rate $\dot{\psi}$ (i.e., a left turn) can indicate that the host vehicle 101 will not cross roadway lanes with oncoming targets 200, and the computer 105 can suppress threat mitigation when the sign of the yaw rate $\dot{\psi}$ is positive.

Upon determining that the yaw rate $\dot{\psi}$ is below the threshold, the computer 105 can identify the front corner point 300 of the target 200 and determine a corner time to collision. As used herein, the "corner time to collision" is a predicted time until a collision between the origin O and the front corner point 300 of the target 200. The computer 105 can determine the corner time to collision $TTC_{corner}$ based on the range r and the range rate $\dot{r}$:

$$TTC_{corner} = \frac{r}{\dot{r}} \qquad (1)$$

Based on the corner time to collision $TTC_{corner}$, the computer 105 can determine to suppress threat mitigation. When the corner time to collision $TTC_{corner}$ exceeds a time threshold, the computer 105 can determine that the vehicle 101 will not collide with the front corner point 300 of the target 200 and can suppress threat mitigation, e.g., suppress actuation of a brake. The time threshold can be determined based on, e.g., empirical testing of a time required for the vehicle 101 to clear the path of the target 200 during a turn. When the corner time to collision $TTC_{corner}$ exceeds the time threshold, the computer 105 can determine that the vehicle 101, if in a turn, would complete the turn before the target 200 reaches the vehicle 101, and thus the computer 105 can determine to suppress threat mitigation. Alternatively, when the corner time to collision $TTC_{corner}$ is below the time threshold, the computer 105 can actuate one or more components 120 to avoid and/or mitigate a potential collision, e.g., the computer 105 can actuate a brake, a steering component, a throttle, etc.

To suppress threat mitigation, the computer 105 can determine a threat multiplier. As used herein, the "threat multiplier" is a numerical value that is multiplied to the threat number to determine the overall threat number TN. For example, the threat multiplier may be 0 to indicate that the host vehicle 101 is not likely to collide with the target 200 even when the threat number indicates otherwise. That is, the threat multiplier can be a binary value of 0 or 1, where a threat multiplier of 1 indicates that the computer 105 should continue with threat mitigation based on the overall threat number TN and a threat multiplier of 0 indicates that the vehicle 101 is in a false positive scenario and the computer 105 should not perform threat mitigation. Alternatively, the threat multiplier may be a different number to account for the additional or lower risk of collision based on data 115 about the front corner point 300 of the target 200, e.g., a number between 0 and 1. That is, the threat multiplier between 0 and 1 can adjust the overall threat number TN to more accurately assess the risk of collision. For example, the threat multiplier can reduce the overall threat number TN from above 0.7 to below 0.7, and the computer 105 can, as described above, actuate components 120 in a different manner when the overall threat number TN is below 0.7. When the computer 105 determines that the corner time to collision $TTC_{corner}$ is above the time threshold, the computer 105 can set the threat multiplier to 0. Thus, the computer 105 will not perform threat mitigation when the threat multiplier is 0.

Figure 4:
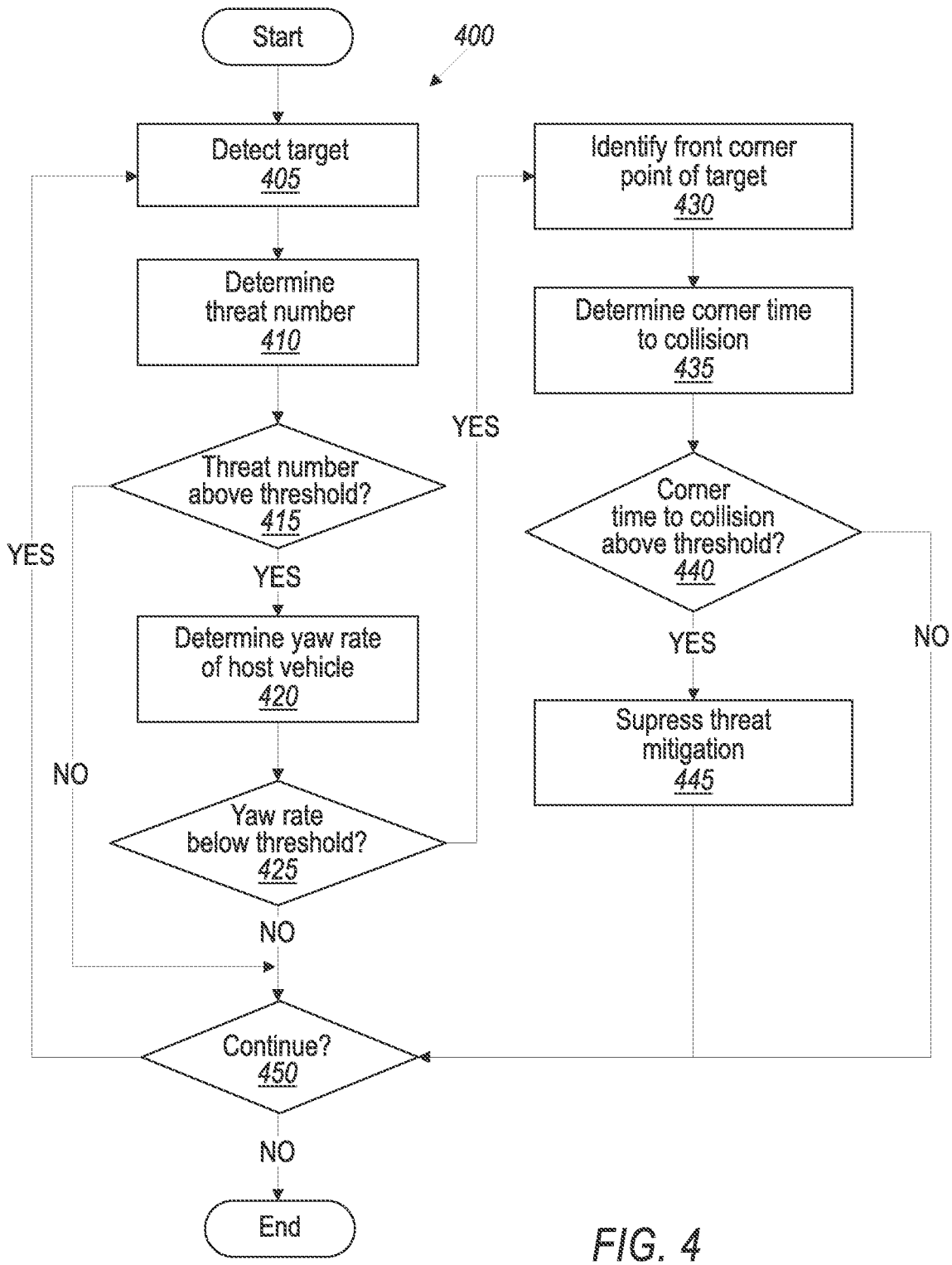
FIG. 4 is a diagram of an example process for operating the vehicle.

FIG. 4 is a diagram of an example process 400 for operating a vehicle 101. The process 400 begins in a block 405, in which a computer 105 detects a target 200. The computer 105 can, based on data 115 collected by sensors 110, detect a target 200 and determine e.g., a target length $l_{tg}$, a target width $w_{tg}$, a target speed, etc. Upon detecting the target 200, the computer 105 can determine whether a collision is likely between the target 200 and the host vehicle 101.

Next, in a block 410, the computer 105 determines a threat number based on a front center point 215 of the target 200. As described above, the computer 105 can identify a point substantially at a center of a front bumper of the target and can determine a threat number based on a likelihood of a collision between the host vehicle 101 and the front center point 215. The threat number can be, e.g., an acceleration threat number ATN, a brake threat number BTN, a steering threat number STN, etc.

Next, in a block 415, the computer 105 determines whether the threat number exceeds a threshold. As described above, when the threat number exceeds the threshold, the computer 105 can determine that the host vehicle 101 is likely to collide with the target 200 absent threat mitigation. If the threat number exceeds the threshold, the process 400 continues in a block 420. Otherwise, the process 400 continues in a block 450.

In the block 420, the computer 105 determines a yaw rate $\dot{\psi}$ of the host vehicle 101. As described above, the yaw rate $\dot{\psi}$ is a measure of a change in a yaw angle $\psi$. The yaw rate $\dot{\psi}$ can indicate whether the host vehicle 101 is turning toward a perpendicular roadway lane, performing a lane change, or on a curved roadway.

Next, in a block 425, the computer 105 determines whether the yaw rate $\dot{\psi}$ is below a threshold. The threshold can be determined based on, e.g., a minimum yaw rate $\dot{\psi}$ required to perform a turn into a perpendicular roadway lane. The threshold can be determined such that yaw rates $\dot{\psi}$ below the threshold may not be a turn, e.g., a lane change, a curved road, etc. For example, as described above, the minimum yaw rate $\dot{\psi}$ can be determined based on a simulation of a vehicle 101 turning from a roadway lane into a perpendicular roadway lane for a plurality of specified yaw rates $\dot{\psi}$. If the yaw rate $\dot{\psi}$ is below the threshold, the process 400 continues in a block 430. Otherwise, the process 400 continues in the block 450.

In the block 430, the computer 105 identifies a front corner point 300 of the target 200. As described above, the front corner point 300 is a point on the front bumper of the target 200 at the target width $w_{tg}$. The computer 105 can identify the front corner point 300 as the closest corner point to the origin O on the front bumper of the host vehicle 101, i.e., the point on the target 200 that the host vehicle 101 will likely contact first in a collision.

Next, in a block 435, the computer 105 determines a corner time to collision $TTC_{corner}$ between the host vehicle 101 and the front corner point 300. As described above, the computer 105 can determine the corner time to collision $TTC_{corner}$ based on a range r and a range rate $\dot{r}$ between the origin O on the host vehicle 101 and the front corner point 300.

Next, in a block 440, the computer 105 determines whether the corner time to collision $TTC_{corner}$ exceeds a time threshold. The time threshold can be, e.g., an average time for the host vehicle 101 to complete the turn into the perpendicular roadway lane. If the corner time to collision $TTC_{corner}$ exceeds the time threshold, the process 400 continues in a block 445. Otherwise, the process 400 continues in the block 450.

In the block 445, the computer 105 suppresses threat mitigation. As described above, the computer 105 can determine that a collision with the target 200 is not likely because, e.g., the host vehicle 101 is not in a turn but rather is performing a lane change or is on a curved roadway. The computer 105 can set a threat multiplier to 0 and multiply the threat number by the threat multiplier. Because the multiplied threat number is 0, the computer 105 does not perform further actions to prevent or mitigate a collision between the host vehicle 101 and the target.

In the block 450, the computer 105 determines whether to continue the process 400. For example, the computer 105 can determine to continue the process 400 if the vehicle 101 is still operating on a route. In another example, the computer 105 can determine not to continue the process 400 if the vehicle 101 is stopped and powered off, e.g., when parked. If the computer 105 determines to continue, the process 400 returns to the block 405 to detect another target 200. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine a yaw rate for a host vehicle;
   upon determining that the yaw rate is below a threshold, identify a target and a front corner point of the target;
   determine a time to collision between the host vehicle and the front corner point of the target; and
   activate suppression of actuation of one or more vehicle components performing threat mitigation between the host vehicle and the target when the time to collision exceeds a time threshold.

2. The system of claim 1, wherein the instructions further include instructions to identify the front corner point as a closest corner point of the target to the host vehicle.

3. The system of claim 1, wherein the instructions further include instructions to determine a threat number based on a front center point of the host vehicle and a front center point of the target.

4. The system of claim 3, wherein the instructions further include instructions to determine the threat number based on a center time to collision between the front center point of the host vehicle and the front center point of the target.

5. The system of claim 3, wherein the instructions further include instructions to actuate a component based on a threat number.

6. The system of claim 3, wherein the instructions further include instructions to, upon determining that the threat number exceeds a threat threshold, determine whether the yaw rate is below the threshold.

7. The system of claim 3, wherein the instructions further include instructions to multiply a threat multiplier to the threat number to suppress the threat mitigation.

8. The system of claim 7, wherein the instructions further include instructions to set the threat multiplier to zero when the time to collision exceeds the time threshold.

9. The system of claim 1, wherein the instructions further include instructions to actuate a brake when the time to collision is below the time threshold.

10. The system of claim 1, wherein the instructions further include instructions to identify the front corner point of the target based on a lateral width of the target.

11. The system of claim 1, wherein the instructions to suppress the threat mitigation further include instructions to suppress actuation of a brake.

12. The system of claim 1, wherein the instructions further include instructions to determine whether the host vehicle is in a turn based on a sign of the yaw rate.

13. The system of claim 12, wherein the instructions further include instructions to suppress the threat mitigation when the sign of the yaw rate is negative.

14. The system of claim 1, wherein the instructions further include instructions to actuate one or more vehicle components to perform the threat mitigation when the time to collision is below the time threshold.

15. The system of claim 1, wherein the instructions further include instructions to actuate a sensor to determine a distance between the host vehicle and the front corner point of the target and to determine the time to collision based on the distance.

16. A method, comprising:
    determining a yaw rate for a host vehicle;
    upon determining that the yaw rate is below a threshold, identifying a front corner point of a target;
    determining a time to collision between the host vehicle and the front corner point of the target; and
    activating suppression of actuation of one or more vehicle components performing threat mitigation between the host vehicle and the target when the time to collision exceeds a time threshold.

17. The method of claim 16, further comprising determining a threat number based on a front center point of the host vehicle and a front center point of the target.

18. A system, comprising:
    a brake in a host vehicle;

means for determining a yaw rate for the host vehicle
means for identifying a front corner point of a target upon determining that the yaw rate for the host vehicle is below a threshold;
means for determining a time to collision between the host vehicle and the front corner point of the target; and
means for actuating suppression of the brake performing threat mitigation between the host vehicle and the target when the time to collision exceeds a time threshold.

19. The system of claim 18, further comprising means for determining a threat number based on a front center point of the host vehicle and a front center point of the target.

* * * * *